United States Patent [19]
Kantola

[11] Patent Number: 5,878,128
[45] Date of Patent: Mar. 2, 1999

[54] METHOD OF COMMUNICATION AND CONNECTION CONTROL

[75] Inventor: Raimo Kantola, Highlands, N.J.

[73] Assignee: Nokia Telecommuniction Oy, Espoo, Finland

[21] Appl. No.: 670,705

[22] Filed: Jun. 26, 1996

Related U.S. Application Data

[63] Continuation-in-part of Ser. No. 401,918, Mar. 9, 1995, abandoned.

[51] Int. Cl.$^6$ ...................................................... H04N 7/00
[52] U.S. Cl. .......................................... 379/230; 379/207
[58] Field of Search ................................... 379/201, 207, 379/229, 230; 370/259

[56] References Cited

U.S. PATENT DOCUMENTS

| | | | |
|---|---|---|---|
| 5,479,495 | 12/1995 | Blumhardt | 379/207 |
| 5,526,415 | 6/1996 | Wakamoto | 379/207 |
| 5,657,451 | 8/1997 | Khello | 370/259 |

FOREIGN PATENT DOCUMENTS

| | | |
|---|---|---|
| 509 705 | 10/1992 | European Pat. Off. . |
| 569 180 | 11/1993 | European Pat. Off. . |
| 93/05599 | 3/1993 | WIPO . |

OTHER PUBLICATIONS

Pavon et al., Telecommunications Information Networking Architecture Consortium, "Communciation Session Management (CSM) Specification". (Draft) Sep. 6, 1994.

Kuisch et al., "A Practical Approach to Service Interactions", IEEE Communications Magazine, pp. 24–31.

*Primary Examiner*—Daniel S. Hunter
*Attorney, Agent, or Firm*—Pillsbury Madison & Sutro LLP

[57] ABSTRACT

A system architecture offering service includes a Connection Management, a Service Management, and a Communication Session Management. A special adaptation software forms a description of the logical configuration of the communication between parties of the service, and a description of the status of the connection organs, which describes the physical connection between the subscribers or subscriber and a legacy exchange. In response to a system service request by a telecommunication network the Service Management gives a description of the desired communication status which corresponds to the requested service of the communication status, and the description of the state of the connection organs. The Communication Session Management determines what kind of communication status corresponds to the given connection status, utilizing the description of the status of the connection organs that has been transmitted to it. In response to the connection status, the Connection Management makes the connections in such a way that a connection corresponding to the desired service is created.

17 Claims, 2 Drawing Sheets ns of the network
technology. The same service can be produced with different
techniques. For example, the voice message service can be
produced using ATM VC or a narrow band ISDN network.
In the proposed architecture, the services comprise a group
of interactive service components. Some components are
service specific and can use services offered by the general
service components. The general service components offer
services which are related to the processing of different
types, communication services, for example audio and
video, and special resource services, for example conference
rings.

METHOD OF COMMUNICATION AND CONNECTION CONTROL

REFERENCE TO RELATED APPLICATION

This is a continuation-in-part of application Ser. No. 08/401,918, Filed Mar. 9, 1995, now abandoned.

FIELD OF THE INVENTION

This invention relates to controlling the connections and communication in a telecommunication network.

BACKGROUND ART

The demands for supporting and producing different services has directed the development of data communication networks in the direction of a so-called intelligent network IN. An intelligent network is an architecture the purpose of which is to offer modular operations independent of the service used, which operations can be connected to each other as components when creating new services, whereby the determining and planning of the new services is easier. The second object is to be independent of a telecommunication network in the supply of the services. The services would be separate from the lowest physical network structure, in which case they can be distributed.

The so-called Basic Call State BCSM has been defined for the intelligent network. It is a description of the functions of the call control function CCF, which are needed for the setting up and maintaining of the connection route between the users. Thus BCSM offers the framework for the description of those basic call and connection events which can lead to the IN service logic to become active; in other words it detects those detection points DP in a call process and connection process in which the call control can be in an interaction with the IN service logic object and in which the transfer of the control can take place.

Also, other network architectures have been presented in which the objective is to separate the network control from the telecommunications network. One of such architectures has been described in PCT application WO93/05599. The control function system of the network has been separated from the call control, but the solution requires to construct the network from the outset according to the presented operating principle and it does not provide information as to how the present public switched telephone network PSTN could be connected to the network in accordance with the application.

The architecture idea that has been presented in the aforementioned PCT application can be developed further. Architecture, in which various traditional call processing functions, such as switching fabric or channel control, call control, and connection control are separated into distinct application processes, is described in European patent applications EP-0631456 and EP-0631457.

Architecture similar to that described in EP-applications, i.e. architecture, in which the handling of connection means and other network resources possibly needed by the call is totally separated from the handling of the transmission of messages between the parties of the call (end-users) and service itself, has been proposed by Telecommunications Information Network Architecture Consortium, TINAC. The parties of the call first discuss what kind of network resources they need, and the network resources are reserved and given to use only when they are really needed. This makes separate development of transmission resources and connection resources and services possible. Then, the network control can use services irrespective of the network technology. The same service can be produced with different techniques. For example, the voice message service can be produced using ATM VC or a narrow band ISDN network. In the proposed architecture, the services comprise a group of interactive service components. Some components are service specific and can use services offered by the general service components. The general service components offer services which are related to the processing of different types, communication services, for example audio and video, and special resource services, for example conference rings.

In this architecture, the connections are handled by Connection Management, the control software called Communication Management is responsible for the communication, and the control software called Service Management carries out the service.

The proposed operation is of such nature that when a service is used, the Service Management gives to the Communication Management a description of the desired communication status, which corresponds to the requested service. The Communication Management determines what the connection status must be in order to reach the given communication status. It provides the Connection Management with the description of the connection status, in which case the Connection Management makes the connections so that the desired connection will be established. The concepts of communication status and connection status are briefly described in the following. The communication status is based on the concept called Logical Connection Graph, LCG. The Service Management specifies the communication resources needed as "Logical Connection Graph" terms, irrespective of the network structure and technique.

The information model, shown in FIG. 1 of the attached drawings, presents in a simplified manner what the communication status refers to. The stream interfaces represent abstractions of the devices, and the binding interfaces represent abstractions either of the local connections or of the long distance connections. Both are controlled through the corresponding operational interface, which offers functions for the beginning, modification and deletion of the objects. The figure represents the parties of the communication and their interfaces, when the parties are engaged in the communication session. The stream is a unidirectional bit flow having a given frame structure (format, coding) and the quality of service QoS parameters, which determine the time alignments of the frames, synchronizing demands between the steams, etc. The communication session management CSM provides the interface for specifying the bindings of the stream interfaces explicitly and for control of the bindings. A stream binding object defines the relationship between the stream interfaces. Virtual devices are abstractions of actual physical devices. Streams are unidirectional point to point or point to multipoint, that is, they consist of one or more branches. A stream branch is defined between the producer and each customer. Logical Connection Graph LCG is equivalent to stream binding. It comprises logical vertexes connected by the logical lines through a logical gate.

FIG. 2 shows the contents of FIG. 1 as LCG concepts. LCG is not interested in the location of the resources in the network. It is needed for the defining of the operations which control stream bindings in order to specify the interface offered by the CSM. In other words, it must know the communication status as LCG concepts so that the communication session management CSM can operate.

To be able to operate perfectly, CSM needs to be provided with a description of the connection status. The concepts of physical connection graph PCG, which represents the network connections, and the nodal connection graph NCG, which represents the configuration of the resources of the nodes have been derived from the LCG. The term "physical" refers to the network and the term "nodal" refers to the nodes between which the network establishes the connections.

The difference between the physical and the logical graph lies in the fact that the logical configuration of the connection resources does not pay attention as to where the resources are, whereas the physical configuration is aware of their location. The logical connection graph LCG represents an end to end connection between computational interfaces and the physical connection graph PCG represents a connection between network termination points. The computational interfaces can be in this context of current type or functional. The essential point of the new architecture is that they can be of stream type. There is a conversion from the logical addresses of the logical connection graph into a physical address of the physical connection graph. The conversions from the logical lines into physical lines exist likewise. Several LCG elements can be grouped as one element by multiplexing or a few LCG elements can be converted into several physical elements by decomposition.

When the new network architecture presented above is brought into use, a problem will arise as how to adapt the new architecture to the existing network such as the intelligent network. One solution is to bring the described network architecture into use in some overlay network, such as an ATM or other broad band network, and to match this new network with an existing network without changing the architecture of either one. The integrated use would be carried out possibly by means of a separate adaptation program and separate hardware. The adaptation program can be inserted in the new architecture, in which case changes in existing systems are not needed.

A drawback of the solution presented above is that with the integrated use of the networks it is not possible to utilize the software technology, which would open the network to an open software competition. Thus, the integrated use does not offer alternative ways to utilize in the best way the proposed new architecture and the existing architecture. The solution based on the integrated use leads to the fact that the standardization of the existing networks and the proposed new network would have to be pursued side by side.

SUMMARY OF THE INVENTION

This invention proposes a solution which does not have the drawbacks of the integrated use, and which can be used to connect the new architecture to an existing telecommunication network. According to a first embodiment of the invention, the basic call state model BCSM of the service switching point SSP in the existing intelligent network IN is utilized. The desired detection point or points are set to the BCSM of SSP so that, after the call process has proceeded to some detection point, three information structures required by the new architecture are formed, namely the description of the communication status that has been presented as a logical connection graph, and the description of the state of the connection means that has been presented as a nodal graph and as a physical connection graph. These information structures are formed by the special adaptation software. It can be carried out either at the new architecture's side or at the legacy network's side. In both cases, the legacy network can be seen as one object as seen from the side of new architecture, and the communication status and connection status comprehensively describe SSP and status of the network behind it. These information structures are transmitted to the program's "Service Session Management" and/or "Communication Session Management CSM", which from this moment on take responsibility for processing the service required. The software of the new architecture approves the communication status and the connection status which have been transmitted from the detection point DP, and, after this, proceeds as it desires.

The SSP approves the transfer of responsibility to the software of the new architecture by shifting to a special call hold state. In this state, the SSP is not responsible for the statuses of the connection resources of the call, even though the state machine of the call (BCSM) still exists. In this state, the new architecture can, for example, connect the call to an another call, a message device or a conference ring. To do this, the SSP offers a new interface (Cm) to the service systems which are in accordance with the new architecture.

When the call or a part of it in the legacy network is to be released, the BCSM which is in the hold state, will notify the new architecture of this. The new architecture returns the state of the connection means of the part of the call in question to such which BSCM knows, and gives the BSCM permission to continue releasing normally.

According to a second embodiment of the invention the exchange of the legacy network does not include the operations of the SSP of the intelligent network. However, such an exchange is able to terminate a call to the service system which is in accordance with new architecture, too, i.e. the legacy exchange contains the functions of the end point exchange. The starting point is of such nature that the network of the new architecture is the outcome as a result of, for example, the normal routing that has been defined to the legacy network, on the basis of the dialed number conversion or as the result of a call forwarding. The special adaptation software can be located at the exchange of the legacy network which contains the functions of the end point exchange or in the service system of new architecture. The call machine of the aforementioned legacy exchange can be commanded to a hold state, and the exchange offers the interface Cm in accordance with the first embodiment. The service system of the new architecture takes as its starting information the graph information structure it has received, and can now proceed with the call as it desires.

When a call or part of it in the legacy network has to be released, the call automatic machine of the legacy exchange, being in the hold state, will inform of this to the new architecture with a message allowed by the interface between the networks. The new architecture returns the connection means of the part of the call to such a state which is known by the call automatic machine, and gives the legacy exchange permission to continue the releasing normally.

DETAILED OF THE PREFERRED EMBODIMENTS

THE FIRST EMBODIMENT

Figure 1:
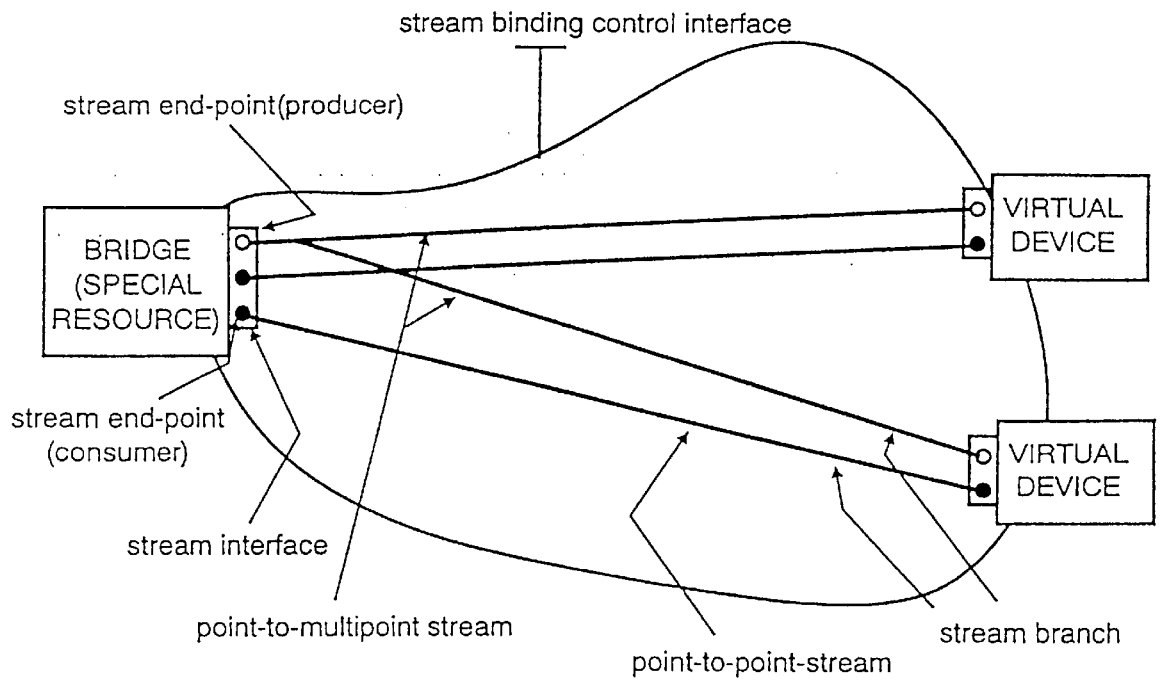
FIG. 1 represents the information model of the communication state in the new network.
Figure 2:
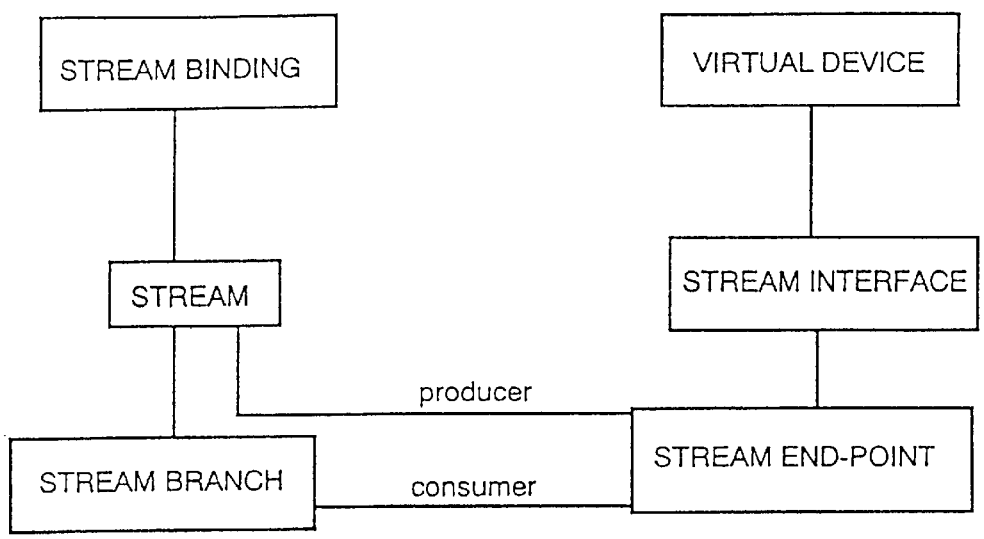
FIG. 2 depicts the information model as LCG concepts.

In the solution according to the first embodiment, the starting point is that in the intelligent network, the service switching point SSP must send to the service control point SCP, as is well known, a certain communication state between the parties of the call and a certain state of the connection means. Using the information of these states as a basis, the special adaptation software forms the descriptions of the states of a communication status and connection status required by the new architecture. The adaptation software can be a part of the SSP of the legacy network, or it can be in the new architecture entirely.

When the special adaptation software is a part of the SSP, it will contain the description of the network resources according to the Network Resource Information Model, NRIM, of the new architecture. At the least, the legacy network has been described using the model so that it has all the endpoints of the legacy network from which the new network can be accessed and connection points in the SSP from which the call can be connected further. Likewise, the model must describe the special resources of the legacy network, the use of which one wants to make possible from the new architecture. These can, for example, be conference rings, voice generators and message devices.

When the special adaptation software has been implemented within the new architecture, SSP must answer those inquiries which the adaptation software makes when searching for information to form logical, nodal and physical connection graphs. Alternatively, the SSP can offer necessary information in the message to the adaptation program, which uses the information received to form the necessary information graphs. The message informs at least the point in SSP to which the call is connected at that moment, and the A-subscriber data.

In the solution according to the first embodiment, such a change must be done in SSP, that it approves the transfer of responsibility to software of the new architecture by going to the special hold state, of the call. In this state SSP does not have a responsibility for the states of the connection resources of the call, even though the state machine of the call BCSM exists, too, and operates as will be described below. In this state, the new architecture can connect, for example, the call to an another call, a message device or a conference ring. For this purpose, SSP offers a new interface (Cm) for the service systems which are in accordance with the new architecture. The interface can be described in two different ways.

Firstly, this interface can be given the desired physical connection which one wishes to make. The ISDN exchanges usually know this operation and provide the possibility to make it, for example, on the MML (Man Machine Language) command, which is used for control of the exchange. This feature can be used either as such or it can be offered by new software through a special protocol, which does not load the operation and maintenance function of the exchange. The latter way is better, because it offers a better load capacity of the SSP.

Secondly, this interface can be given the physical connection graph, which one wishes the SSP to carry out. However, it must be noted that if the legacy network has been described to such an extent which the placing of the special adaptation software as part of SSP requires, the new architecture sees the connection from the subscriber to SSP as one undivided whole, and it does not try to change this connection. The new architecture can change call connections only by adding new links to the call. This restriction is a natural consequence of the need to restrict the changes in the legacy network to be minor. However, this invention allows that the legacy network is described more thoroughly in NRIM (information content of the model is wider) so that the new architecture can also handle switchings between the subscriber and SSP connection. Then, the software in the new architecture must first command the state machines also in other exchanges than in the SSP to the hold state, i.e. the changes required of the legacy network are more extensive.

When the new architecture has received the communication status and the connection status, its software approves the initial state which is in accordance with the description it has received and proceeds as it desires when generating a call, however, within the time limits of the present BCSM that have been set to the hold state.

When one wants to release a call, or part of it, in its legacy network, the BCSM in the hold state will notify the new architecture of this. The new architecture returns the state of the switching means of the part of the call in question to such known by the BCSM and gives the BCSM permission to continue the releasing normally.

Figure 3:
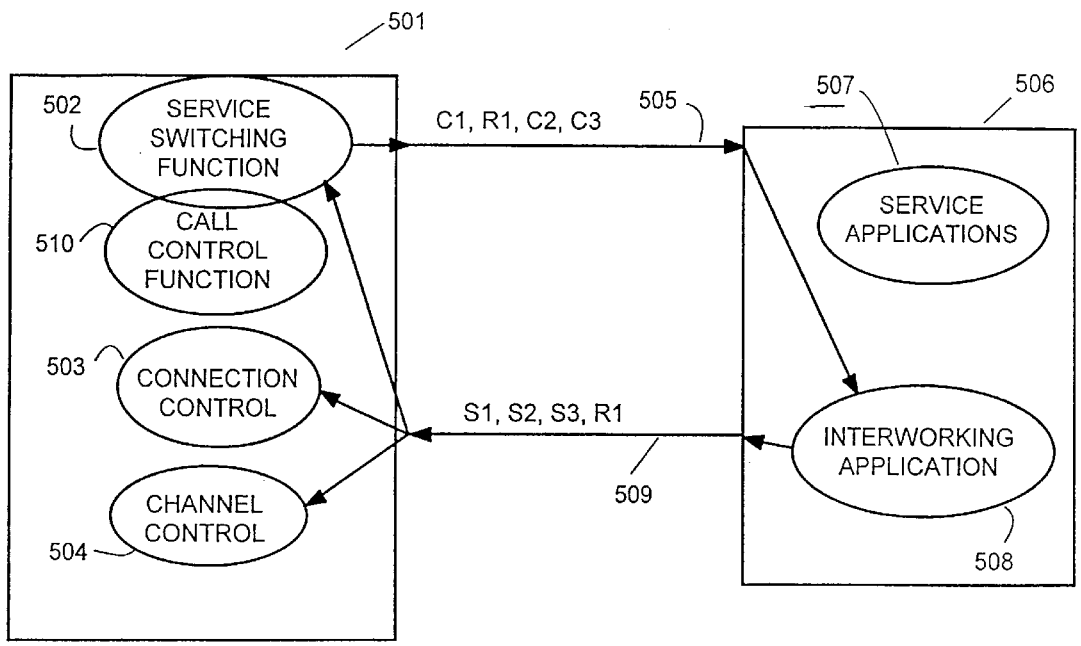
FIG. 3 represents the networks of the first embodiment.

FIG. 3 illustrates the first embodiment, i.e. interworking with the intelligent network IN. In the IN specifications Q.1214 of ITU-T or Intelligent Network Capability Set 1 Core INAP ETS 300 374-1 the SSP is said to have at least the Service Switching Functions containing, for example, the Detection Points and the trigger tables and the Call control functions. For modeling purposes only, functions 503 and 504 have been added in the drawing. In IN implementations, these may be embedded in the Call Control Function. Numeral 501 refers to the Service Switching Point SSP and numeral 506 to a Service System based on the new architecture. Between SSP 501 and the service system 507 are used protocols according to the following tables:

| Operation | Class | Events |
|---|---|---|
| Break-out | C | C1, S1, C4 |
| Release-initiated-by-SSP | U | R1 |
| Release-initiated-by-SS | U | R1 |
| Connect-Channel | C | S2, C3 |
| Connect-Route | C | S3, C3 |
| Pass-info | U | C2 |

Mapping of INAP events:

| Event | INAP | Notes |
|---|---|---|
| C1 | Initial_DP | SSP initiates a session with SCP |
| R1 | Abort | Abort session initiated by SSP or SCP |
| C2 | All existing INAP events except C1, R1 | |

New Events

| Event | Direction | Destination | Explanation |
|---|---|---|---|
| S1 | SS -> LE | Call Control | Hold-call-pass-control-to-SS |
| S2 | SS -> LE | Channel control | Connect Channel to Channel |
| S3 | SS -> LE | Connection Control | Connect Channel to Termination Point Pool |
| C3 | LE -> SS | Interworking function | Acknowledge S2 or S3 |

-continued

| Event | Direction | Destination | Explanation |
|---|---|---|---|
| C4 | LE -> SS | Interworking function | Incoming Channel id, Incoming route id, Incoming Termination Point Pool, Switch id |

A variation of this protocol is suggested: in the initial Detection Point where the Initial_DP message is generated by the SSP, the DP itself has been marked as an entry point to the New Architecture Service System. Consequently, the SSP immediately enters the call-hold-wait-for SS takeover state (cf. the same state which the S SP enters after having received the S1 event in the above described protocol) and sends the modified "Initial_DP" message to the SS. The modified Initial_DP will carry additional information which is in the C4 event of the above described protocol. After that, the SS can manipulate the state of the connection resources by S2 and S3 events.

Any other INAP messages have been marked with C2. This means that one embodiment of this invention is implementing it as an add-on to the existing INAP protocol.

In the above examples, the connection status of the legacy network is described by the following parameters: incoming channel id, incoming termination point pool id, incoming route id, Switch id.

The objects identified by these parameters are managed objects for which the management application is in the preferred embodiment implemented in the new architecture of the Service System or in a separate management system which is part of the new architecture. By management, it is meant that objects can be created, their parameters modified and they can be deleted by the manager.

THE SECOND EMBODIMENT

The second embodiment is the application of new architecture to the legacy network without intelligent network functions. In that case, the exchange of the legacy network which does not contain the SSP functions will be examined. However, such an exchange is able to terminate the call to the service system which is in accordance with the new architecture, too, i.e. the legacy exchange contains the terminal exchange functions.

Figure 4:
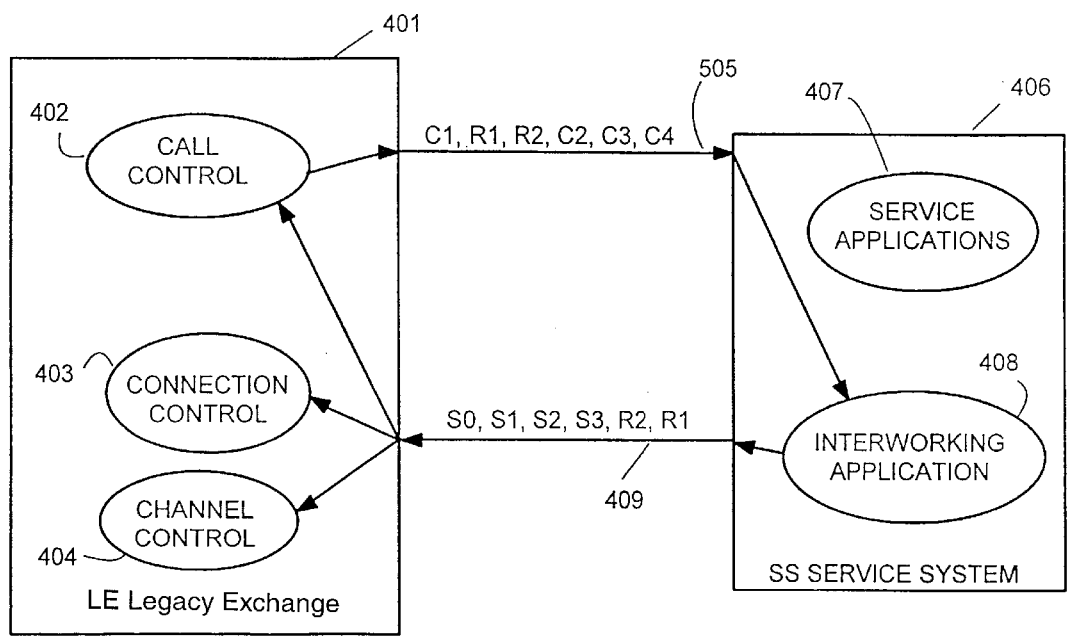
FIG. 4 represents the networks of the second embodiment.

FIG. 4 shows an example of the second embodiment. Note that the legacy system need not be composed of the named functions call control 402, connection control 403 and channel control 404; those functions have been adopted for modeling purposes only. In the figure, numeral 401 refers generally to a legacy exchange and numeral 406 to a Service System based on the new architecture which wants to take over the control of legacy network resources for specific services.

Protocols are in the following table:

| Operation | Class | Events |
|---|---|---|
| Break-out | C | C1, S0, S1, C4 |
| Release-initiated-by-LE | C | R1, R2 |
| Release-initiated-by-SS | C | R1, R2 |
| Connect-Channel | C | S2, C3 |
| Connect-Route | C | S3, C3 |
| Pass-info | U | C2 |

Mapping of DSS1 and CCSS#7 events is depicted in the following table:

| Event | DSS 1 | ISDN User Part |
|---|---|---|
| C1 | Set-up, Alerting | IAM |
| R1 | Disconnect, Release | REL |
| R2 | Release, Release complete | RLC |
| C2 | All except C1, R1, R2 | All except C1, R1, R2 |
| S0 | Call proceeding | CPG |

Protocol in case of new events is shown in the following table:

| Event | Direction | Destination | Explanation |
|---|---|---|---|
| S1 | SS -> LE | Call Control | Hold-call-pass-control-to-SS |
| S2 | SS -> LE | Channel control | Connect Channel to Channel |
| S3 | SS -> LE | Connection Control | Connect Channel to route |
| C3 | LE -> SS | Interworking function | Acknowledge S2 or S3 |
| C4 | LE x> SS | Interworking function | Incoming Channel id, incoming route id, Incoming Termination Point Pool switch id |

The description above and the figures relating thereto are only intended to illustrate the present invention. Various variations and modifications of the invention will become obvious for a person skilled in the art, without departing from the scope and spirit of the attached claims.

I claim:

1. A method for adapting a system offering services to a telecommunication network having at least one telephone exchange including a basic call state model associated with a service switching function of an intelligent network, the basic call state model being arranged for detecting those points in a call establishment process at which a call control function of the exchange can be in co-operation with the service switching function, the method comprising:

(A) setting at least one special detection point to the basic call state model;

(B) in response to the call establishment process proceeding to said special detection point, by a special adaptation software, forming:

(a) a communication status description of a communication status which describes a desired communication status between respective parties of a service in accordance with the service, the communication status comprising logical configuration of communication of the respective parties of the service, to the extent said logical configuration is known to said switching function, and (b) a connection status description of a connection status of connection organs which description describes a physical connection between a subscriber or subscribers and a service switching point, and of the resource configuration of nodes which are related to said network;

(C) transmitting said communication status description and said connection status description to control software of services of said system and to control software of a communication session;

(D) in response to a system service request for a requested service by said telecommunication network, service management giving a description of desired communication status, corresponding to a requested service, using said transmitted communication status description and said connection status description and service logic of said service management;

(E) said communication session control software determining what kind of connection status corresponds to an existing communication status, using said transmitted connection status description;

(F) in response to said determining of said kind of connection status, connection management of said system making connections, such that a connection corresponding to said requested service is created as a call.

2. The method as claimed in claim 1, wherein said special adaptation software is implemented as part of said service switching function, the method further comprising:

describing to said adaptation software all end points of said telecommunications network from which said system is accessible, and connection points of said service switching function from which said call can be connected.

3. The method as claimed in claim 1 wherein said special adaptation software is incorporated as part of said system offering services, the method further comprising:

requesting, from said service switching function, by said special adaptation software, information necessary for forming said communication status description said connection status description.

4. The method as claimed in claim 1, wherein said special adaptation software is incorporated as part of said system offering services, the method further comprising:

said service switching function giving to said special adaptation software a message containing information necessary for forming said communication status description said connection status description.

5. The method as claimed in claim 1, further comprising:

said service switching function accepting transfer of responsibility to said system offering services by going to a hold state and by offering an interface to said system offering services.

6. The method as claimed in claim 5, wherein:

a connection management in said system offering services provides to said interface a physical connection that said system desires said service switching function to carry out.

7. The method as claimed in claim 5, wherein:

a connection management in said system offering services provides to said interface said connection status description in response to which said service switching function determines and carries out a physical connection which corresponds to said connection status description.

8. The method as claimed in claim 5, wherein:

when a call or a part of a call in the telecommunication network is released, a basic call state model, in a hold state, correspondingly notifies said system offering services which, in response to such notification restores the connection status description to be a status known to said basic call state model and gives said system offering services with releasing said call or said part of said call.

9. A method for adapting system offering services to a telecommunication network at least one telephone exchange of which includes a terminal exchange function, the method comprising:

(A) said terminal exchange function giving a service request in regard to a requested service, to said system offering services when a predefined identification condition which is related to a call is fulfilled;

(B) in response to said service request, a special adaptation software forming a communication status description which describes a desired status of communication between parties of the service, including logical configuration of the communication between the parties of the service, and (b) a connection status description of a status of connection organs, which describes a physical connection between subscribers or subscriber and a legacy exchange, and (c) a resource configuration description of resource configuration of nodes that are related to the telecommunication network;

(C) transmitting said communication status description and said connection status description to a service management of said system offering services and to a communication session management;

(D) in response to a system service request by said telecommunications network, said service management giving a description of a desired communication status corresponding to said requested service, utilizing said transmitted communication status description and said connection status description;

(E) said communication session management determining what kind connection status corresponds to an existing communicator status, utilizing said transmitted connection status description;

(F) in response to said kind of connection status, a connection management in said system offering services making connections so as to create a connection corresponding to said requested service as a call.

10. The method as claimed in claim 9, wherein:

said predetermined identification condition results from an event selected from the group consisting of routing performed in said telecommunication network, digit conversion, and call transfer.

11. The method as claimed in claim 9 wherein said special adaptation software is incorporated as part of operations of said terminal exchange, the method further comprising:

describing to said adaptation software all end points of said telecommunications network from which said system offering services is accessible and connection points of said terminal exchange from which said call can be connected.

12. The method as claimed in claim 9 wherein said special adaptation software is incorporated in said system offering services, the method further comprising:

said special adaptation software requesting information from said terminal exchange necessary for forming said communication status description and said connection status description.

13. The method as claim in claim 9, wherein said special adaptation software is incorporated in said system offering services, the method further comprising:

said terminal exchange giving to said special adaptation software a message containing information necessary for forming said communication status description and said connection status description.

14. The method as claimed in claim 9, further comprising:

said accepting transfer of responsibility to said system offering services by setting a call automatic machine to a hold state, and by offering an interface to said system offering services.

15. The method as claimed in claim 14, wherein:

a connection management in said system offering services provides to said interface a physical connection that said system desires said terminal exchange to carry out.

16. The method as claimed in claim 14, wherein:

a connection management in said system offering services provides to said interface said description of said status of connection organs, in response to which said terminal exchange determines and carries out a physical connection corresponding to said description.

17. The method as claimed in claim 14, wherein:

when a call or a part of a call in the communication network is released, said call automatic machine, in said state, correspondingly notifies said system offering services which, in response to such notification returns the description of the status of the connection to a description known to said call automatic machine and gives said system offering services permission to continue with releasing said call.

* * * * *

UNITED STATES PATENT AND TRADEMARK OFFICE
CERTIFICATE OF CORRECTION

PATENT NO. : 5,878,128
DATED : March 2, 1998
INVENTOR(S) : KANTOLA

It is certified that error appears in the above-identified patent and that said Letters Patent is hereby corrected as shown below:

On the title page, change:

[73] Assignee: "Nokia Telecommunication Oy, Espoo, Finland"

to

[73] Assignee: -- Nokia Telecommunications Oy, Espoo, Finland--.

Signed and Sealed this

Seventeenth Day of August, 1999

Attest:

Q. TODD DICKINSON

Attesting Officer

Acting Commissioner of Patents and Trademarks